(12) United States Patent
Kaku

(10) Patent No.: US 12,510,851 B2
(45) Date of Patent: Dec. 30, 2025

(54) IMAGE-FORMING APPARATUS THAT CONSUMES LESS POWER AND GENERATES LESS NOISE DURING EXECUTING A WARM-UP ACTION

(71) Applicant: SHARP KABUSHIKI KAISHA, Sakai (JP)

(72) Inventor: Yuichi Kaku, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 31 days.

(21) Appl. No.: 18/435,247

(22) Filed: Feb. 7, 2024

(65) Prior Publication Data
US 2024/0280929 A1 Aug. 22, 2024

(30) Foreign Application Priority Data
Feb. 16, 2023 (JP) ................... 2023-022546

(51) Int. Cl.
*G03G 15/00* (2006.01)
*G03G 15/20* (2006.01)

(52) U.S. Cl.
CPC ....... *G03G 15/205* (2013.01); *G03G 15/5004* (2013.01); *G03G 15/5008* (2013.01); *G03G 15/5016* (2013.01)

(58) Field of Classification Search
CPC ............. G03G 15/205; G03G 15/5004; G03G 15/5008; G03G 15/5016; G03G 15/80; G06F 3/1204; G06F 3/1221; G06K 15/002; G06K 15/4055; G06K 15/406; H04N 1/00891; H04N 1/00896

USPC ............................................... 399/70, 81, 88
See application file for complete search history.

(56) References Cited

U.S. PATENT DOCUMENTS

| | | | |
|---|---|---|---|
| 11,523,018 B1 * | 12/2022 | Miyahara | H04N 1/00896 |
| 2012/0204046 A1 * | 8/2012 | Baba | G06F 1/3231 713/323 |
| 2015/0235115 A1 * | 8/2015 | Hagiwara | G06K 15/408 358/1.13 |
| 2015/0248156 A1 * | 9/2015 | Haraguchi | G06F 1/3231 713/323 |
| 2017/0111535 A1 * | 4/2017 | Morimoto | H04N 1/00891 |
| 2017/0126917 A1 * | 5/2017 | Yamamizu | G06K 15/4055 |
| 2019/0265633 A1 * | 8/2019 | Yokoyama | G06F 1/3231 |

(Continued)

FOREIGN PATENT DOCUMENTS

JP 7027604 B2 3/2022

*Primary Examiner* — Robert B Beatty
(74) *Attorney, Agent, or Firm* — ScienBiziP, P.C.

(57) ABSTRACT

An image-forming apparatus includes a human detecting sensor, an operation acceptor, an image former, one or more controllers, and one or more power supply controllers, and the controller determines whether the operation acceptor accepted an operation other than a print execution instruction after a sleep state returned to a standby state, causes the image former to execute a predetermined first preparatory action not involving driving of a motor when the operation acceptor accepted the operation other than the print execution instruction, and then, when the operation acceptor accepted the operation of the print execution instruction, causes the image former to execute a predetermined second preparatory action involving driving of the motor and then start image formation.

7 Claims, 7 Drawing Sheets

(56) References Cited

U.S. PATENT DOCUMENTS

2021/0080885 A1\* 3/2021 Akazawa ............ G03G 15/5091
2024/0251048 A1\* 7/2024 Kaku ................. H04N 1/00896

\* cited by examiner

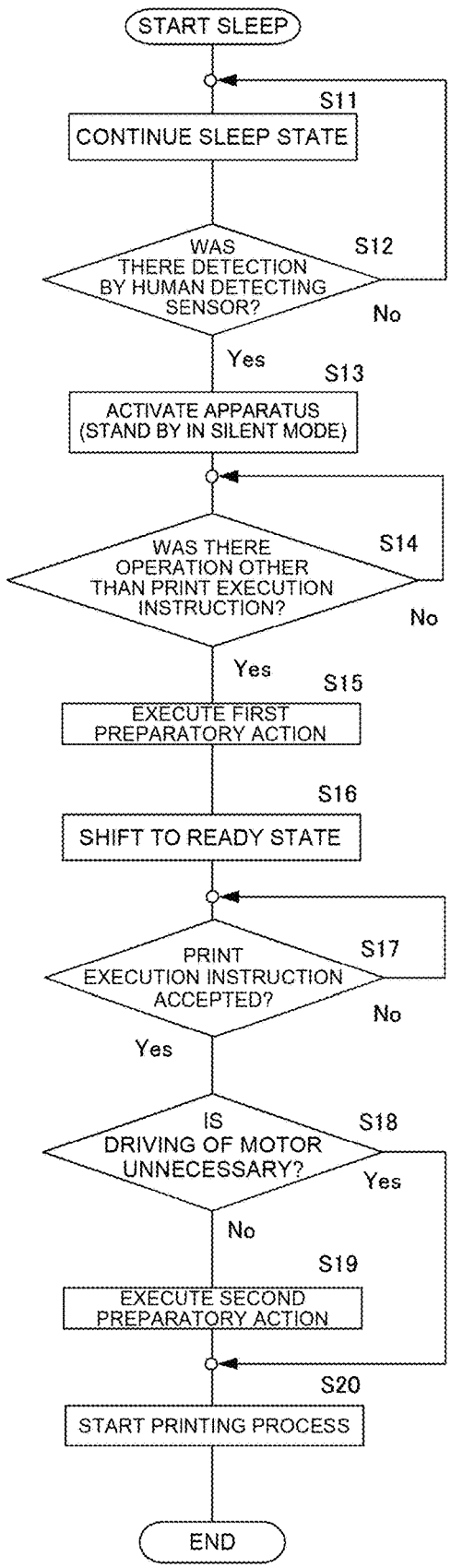

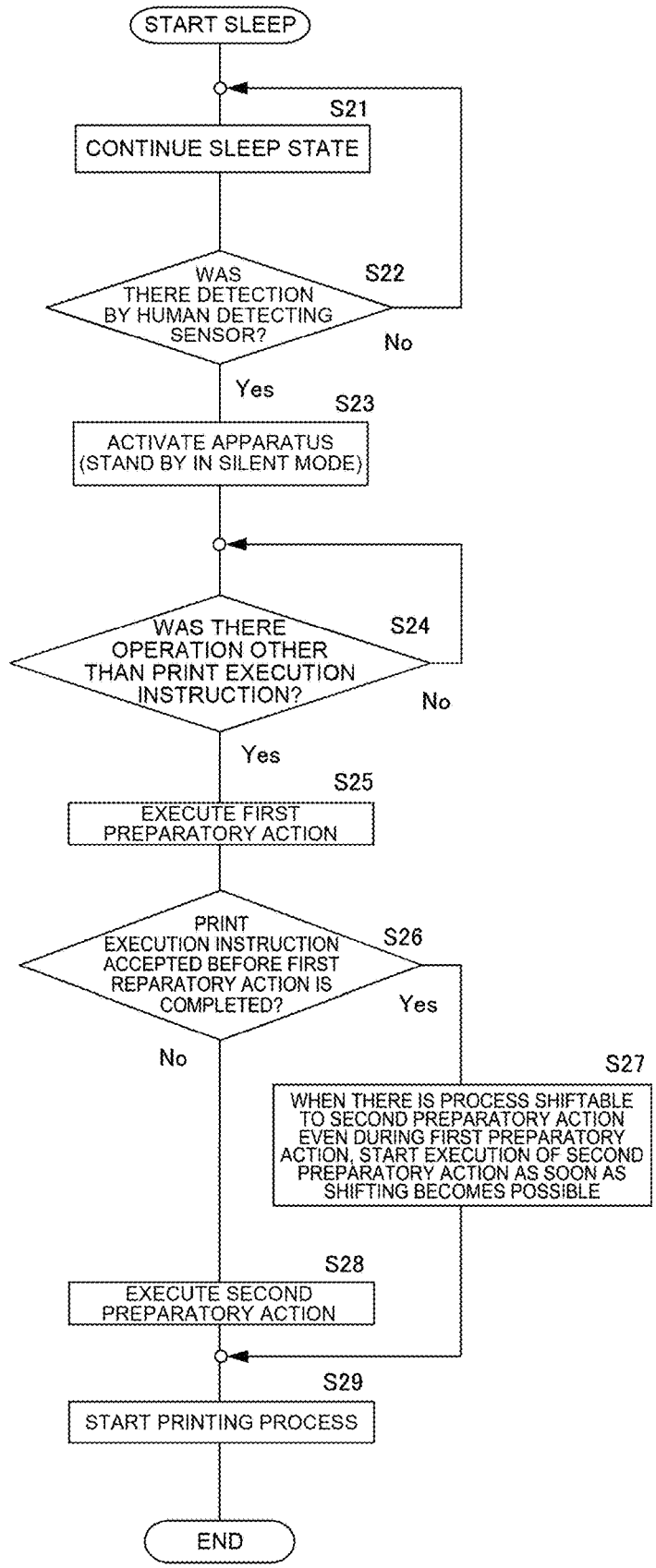

IMAGE-FORMING APPARATUS THAT CONSUMES LESS POWER AND GENERATES LESS NOISE DURING EXECUTING A WARM-UP ACTION

CROSS-REFERENCE TO RELATED APPLICATION

The present application claims priority from Japanese Application JP2023-22546, the content of which is hereby incorporated by reference into this application.

BACKGROUND OF THE INVENTION

1. Field of the Invention

The present disclosure relates to an image-forming apparatus, and more particularly, to an image-forming apparatus having a power-saving mode shift function to suppress power consumption.

2. Description of the Related Art

There is a known image-forming apparatus having a power-saving mode shift function to suppress power consumption by shifting to a sleep state when the apparatus is not in use for a predetermined time and activating the apparatus at predetermined timing, such as detecting a user around the apparatus with a human detecting sensor.

The image-forming apparatus having such a power-saving mode shift function performs a predetermined preparatory action (warm-up action) when shifting from the sleep state to the standby state.

Furthermore, there is also a known image-forming apparatus that may operate by switching two image formation modes in accordance with the type of job: a normal mode in which image formation is performed at a predetermined normal motor speed; and a silent mode for silence in which image formation is quietly performed as compared with the normal motor speed.

However, when the apparatus returns from the sleep state in response to detection by the human detecting sensor and drives the motor to perform the warm-up action every time a person passes near the apparatus, the operation sound is generated each time, and thus the user near the apparatus may feel uncomfortable.

In relation to such an issue, there is a conventionally disclosed image-forming apparatus including a controller that does not drive a motor even when a human detecting sensor does a detection, but drives the motor in accordance with an operation of an instructor, which is used for selecting a copy function displayed on a screen, and after the instructor is operated to select the copy function, executes copying in accordance with an operation of a copy execution instructor, which is used for executing the copy function, so that it is possible to prevent unnecessary power consumption and occurrence of noise caused by a preparatory action of a printer, or the like, when the apparatus returns from a power saving state.

SUMMARY OF THE INVENTION

However, there is a case where the user only wants to change the setting value on the operation panel of the image-forming apparatus, and when the motor is driven to perform the warm-up action even in such a case, power is unnecessarily consumed and noise occurs.

The present disclosure has been made in view of the circumstances as described above, and its object is to provide an image-forming apparatus that consumes less power and generates less noise due to the execution of a warm-up action and has higher user-friendliness than before.

An image-forming apparatus according to one aspect of the present disclosure includes a human detecting sensor, an operation acceptor that accepts an operation from a user, an image former that drives a motor and forms an image based on a print execution instruction accepted by the operation acceptor, one or more controllers that control the human detecting sensor, the operation acceptor, and the image former, and one or more power supply controllers that control power supply that is supplied to the image former and the controller, shifts to a predetermined sleep state when the operation acceptor accepts no operation during a predetermined standby time, and returns from the sleep state to the predetermined standby state when there is a detection by the human detecting sensor after shifting to the sleep state, and the controller determines whether the operation acceptor accepted an operation other than the print execution instruction after the sleep state returned to the standby state, causes the image former to execute a predetermined first preparatory action not involving driving of the motor when the operation acceptor accepted the operation other than the print execution instruction, and then, when the operation acceptor accepted the operation of the print execution instruction, causes the image former to execute a predetermined second preparatory action involving driving of the motor and then start image formation.

According to one aspect of the present disclosure, the "image-forming apparatus" is an apparatus that forms and outputs images, such as a copier or a combined machine having a copying function, e.g., a printer that uses an electrophotographic system for image formation with toner, or a multifunctional peripheral (MFP) that also has functions other than copying.

According to one aspect of the present disclosure, the warm-up action at the time of a return from the sleep state is performed at appropriate timing separately for the first preparatory action not involving driving of the motor and the second preparatory action involving driving of the motor, and thus it is possible to achieve the image-forming apparatus that consumes less power and generates less noise due to the execution of the warm-up action and has higher user-friendliness than before.

Further, preferred aspects of the present disclosure will be described.

In the image-forming apparatus according to one aspect of the present disclosure, when the operation acceptor accepted an operation of the print execution instruction after the controller caused the image former to execute the first preparatory action, and when the controller determines that the second preparatory action is unnecessary, the controller may cause the image former to start image formation without causing the image former to execute the second preparatory action.

In this way, in a case where the print execution instruction was accepted immediately after the previous image formation, the image formation is started without executing the second preparatory action, and therefore it is possible to achieve the image-forming apparatus that consumes less power and generates less noise due to the execution of the warm-up action and has higher user-friendliness than before.

In the image-forming apparatus according to one aspect of the present disclosure, in a case where the operation acceptor accepted an operation of the print execution instruction before the first preparatory action is completed, when there is a process shiftable to the second preparatory action even during execution of the first preparatory action, the controller may cause the image former to start execution of the second preparatory action as soon as shifting becomes possible.

In this way, in a case where the operation of the print execution instruction was accepted before the first preparatory action is completed, when there is a process shiftable to the second preparatory action even during the execution of the first preparatory action, the execution of the second preparatory action is started as soon as shifting becomes possible, and thus it is possible to achieve the image-forming apparatus that has higher user-friendliness than before with regard to the execution of the warm-up action.

In the image-forming apparatus according to one aspect of the present disclosure, the first preparatory action may include a process to detect a mounting state of each component of the image former and a process to detect an error state.

In this manner, in a case where an operation other than the print execution instruction was accepted at the time of a return from the sleep state, the process to detect the mounting state of each component of the image former and the process to detect an error state are performed as the first preparatory action, and thus it is possible to achieve the image-forming apparatus that consumes less power and generates less noise due to the execution of the warm-up action and has higher user-friendliness than before.

In the image-forming apparatus according to one aspect of the present disclosure, a rotation direction of the motor in the second preparatory action may be identical or opposite to a rotation direction of the motor during the image formation.

In this manner, when the rotation direction of the motor in the second preparatory action is opposite to the rotation direction of the motor at the time of image formation, the pressure of a blade of a photoreceptor drum may be reduced before the image formation is executed, and thus it is possible to achieve the image-forming apparatus having higher user-friendliness than before.

In the image-forming apparatus according to one aspect of the present disclosure, a rotation speed of the motor in the second preparatory action may be identical to or different from a rotation speed of the motor during the image formation.

In this manner, the motor is rotated at an appropriate speed corresponding to the process of the second preparatory action, such as image quality adjustment, and thus it is possible to achieve the image-forming apparatus having higher user-friendliness than before.

In the image-forming apparatus according to one aspect of the present disclosure, the image former may include a photoreceptor, a charger that charges the photoreceptor in contact with the photoreceptor, an exposure executor that forms an electrostatic latent image on the photoreceptor, a developer that supplies toner to the photoreceptor and forms a toner image corresponding to the electrostatic latent image, a transferer that transfers the toner image to a recording medium, and a fuser that thermally fuses the toner image to the recording medium, and the photoreceptor, the transferer, and the fuser may be driven by one or more of the motors.

In this way, the warm-up action at the time of a return from the sleep state is performed at appropriate timing in any of the case where the photoreceptor, the transferer, and the fuser are driven by only one motor and the case where they are individually driven by a plurality of motors, and thus it is possible to achieve the image-forming apparatus that consumes less power and generates less noise due to the execution of the warm-up action and has higher user-friendliness than before.

In the image-forming apparatus according to one aspect of the present disclosure, the fuser may include a rotary member driven by the motor and a heater that heats the rotary member, the first preparatory action may include a process to heat the rotary member to a predetermined target temperature while keeping the rotary member stationary, and the second preparatory action may include a process to cause the motor to drive the rotary member while keeping the rotary member heated to the target temperature.

In this manner, when an operation other than the print execution instruction was accepted at the time of a return from the sleep state, the process is performed as the first preparatory action to heat the rotary member of the fuser to the predetermined target temperature while keeping it stationary, and thus it is possible to achieve the image-forming apparatus that consumes less power and generates less noise due to the execution of the warm-up action and has higher user-friendliness than before.

BRIEF DESCRIPTION OF THE DRAWINGS

FIG. 6 is a flowchart illustrating an example of a process in which the digital multifunction peripheral according to a second embodiment of the present disclosure returns from the sleep state and starts a print process.

FIG. 7 is a flowchart illustrating an example of a process in which the digital multifunction peripheral according to a third embodiment of the present disclosure returns from the sleep state and starts the print process.

DETAILED DESCRIPTION OF THE INVENTION

The present disclosure will be further described below in detail with reference to the drawings. It should be noted that the following description is illustrative in all respects and should not be understood that the following description limits the present disclosure.

First Embodiment

Configuration of Digital Multifunction Peripheral 1

A configuration of a digital multifunction peripheral 1 as an example of an image-forming apparatus according to a first embodiment of the present disclosure will be described below with reference to FIGS. 1 and 2.

Figure 1:
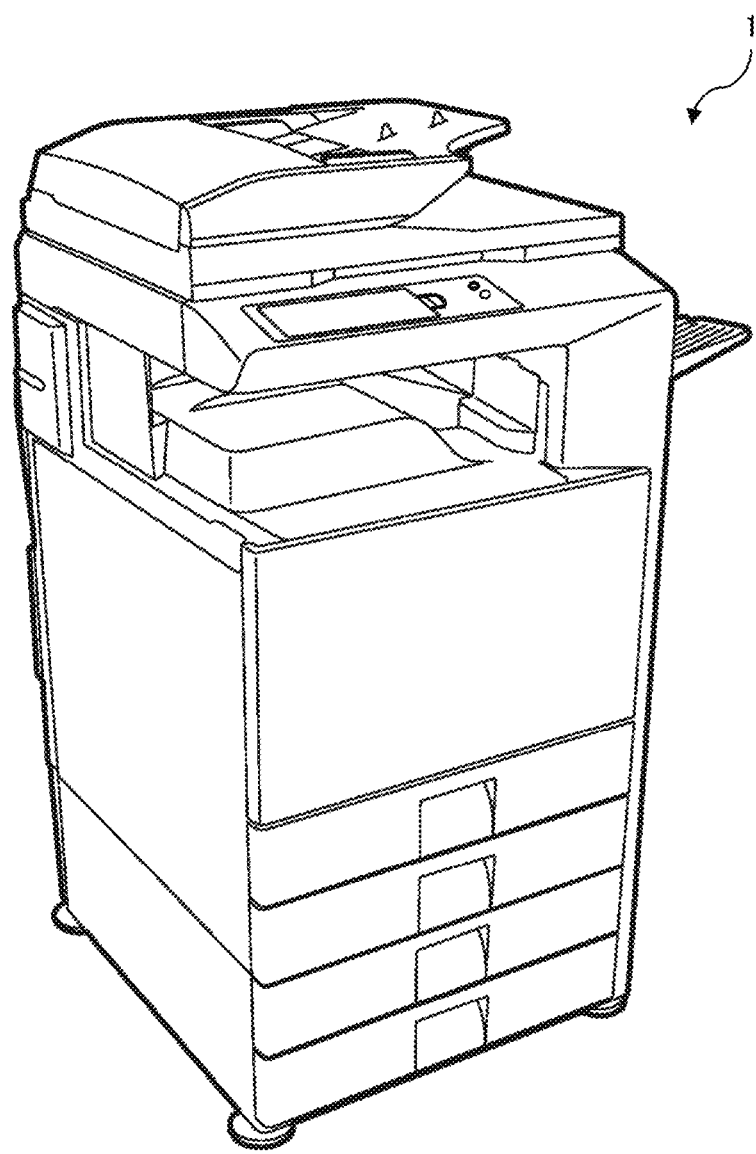
FIG. 1 is a perspective view illustrating an external appearance of a digital multifunction peripheral according to the present disclosure.

FIG. 1 is a perspective view illustrating an external appearance of a digital multifunction peripheral according to the present disclosure.

Figure 2:
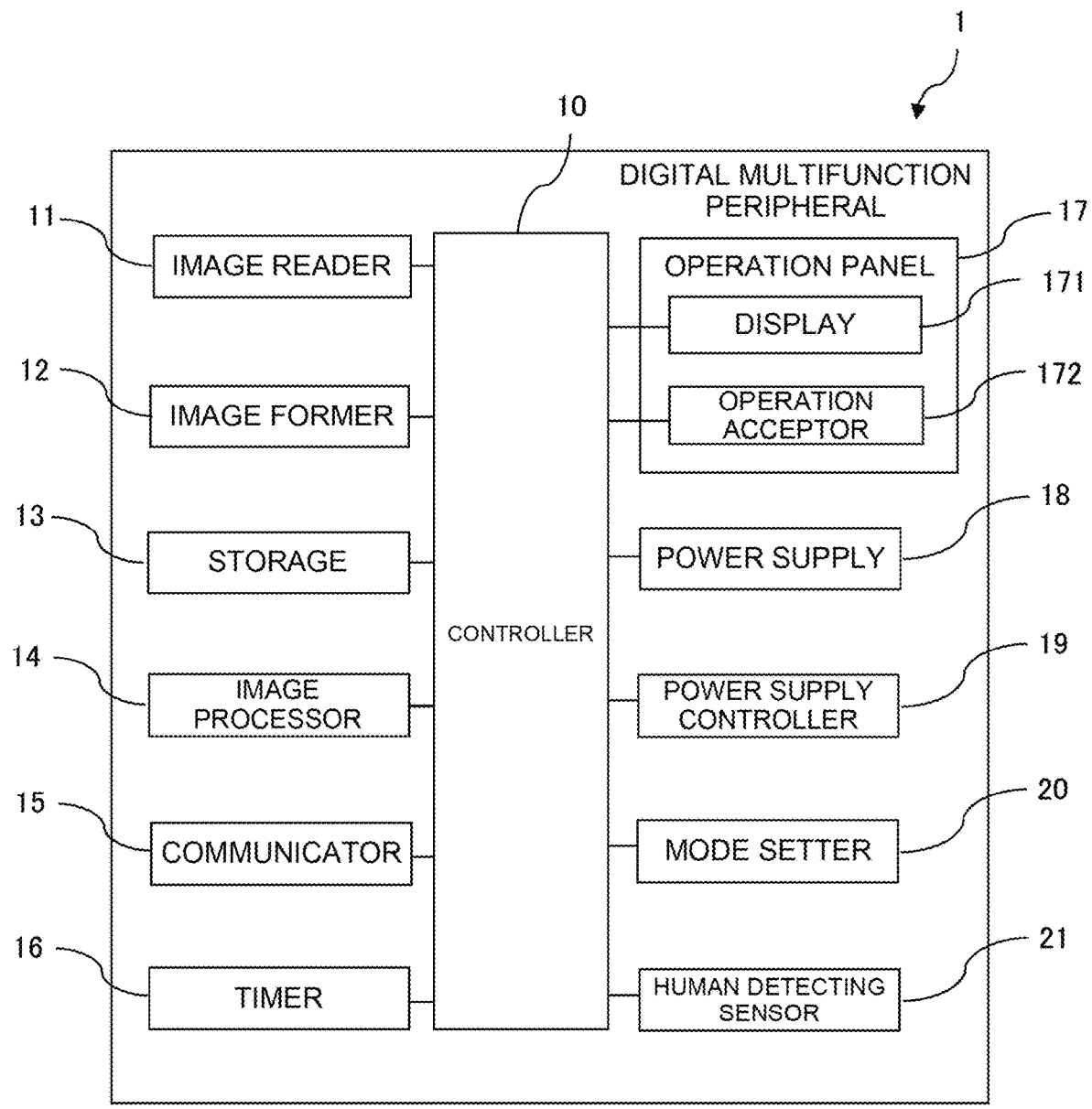
FIG. 2 is a block diagram illustrating a schematic configuration of the digital multifunction peripheral illustrated in FIG. 1.

FIG. 2 is a block diagram illustrating a schematic configuration of the digital multifunction peripheral illustrated in FIG. 1.

The digital multifunction peripheral 1 is an apparatus that has a copy function, a scanner function, and a facsimile function and that digitally processes image data read from a document and outputs the processed image data.

As illustrated in FIG. 2, the digital multifunction peripheral 1 includes a controller 10, an image reader 11, an image former 12, a storage 13, an image processor 14, a communicator 15, a timer 16, an operation panel 17, a power supply 18, a power supply controller 19, a mode setter 20, and a human detecting sensor 21.

Each component of the digital multifunction peripheral 1 will be described below.

The controller 10 integrally controls the digital multifunction peripheral 1 and includes a central processing unit (CPU), a random access memory (RAM), a read only memory (ROM), various interface circuitries, and the like.

In order to control the overall operation of the digital multifunction peripheral 1, the controller 10 detects each sensor and monitors and controls all loads such as a motor, a clutch, and the operation panel 17.

The image reader 11 is a unit that detects and reads a document placed on a document bed or a document conveyed from a paper tray and generates image data.

The image former 12 is a unit that prints out the image data generated by the image processor 14 on a recording medium.

The image former 12 includes one or more motors that drive the image former 12 and may operate by switching two image formation modes in accordance with the type of job: a normal mode in which image formation is performed at a predetermined normal motor speed; and a silent mode for silence in which image formation is performed quietly with less operating noise than normal, such as a silent mode in which image formation is performed at a motor speed slower than the normal motor speed, or a silent mode in which the number of operating noises is reduced.

Furthermore, the image former 12 performs a predetermined warm-up action when returning from the sleep state in order to check the initial position of each component, check whether each component is operable, and perform an adjustment action.

The storage 13 is one or more elements or storage media that store the information necessary for performing various functions of the digital multifunction peripheral 1, a control program, etc. For example, a semiconductor device such as a RAM or a ROM, or a storage medium such as a hard disk, a flash storage, or a solid state drive (SSD) is used.

Further, programs and data may be held in different devices, such that the area for holding data is configured by a hard disk drive and the area for holding programs is configured by a flash storage.

The image processor 14 is a unit that converts the image of the document read by the image reader 11 into appropriate electrical signals and generates image data.

The communicator 15 is a unit that communicates with a computer, a portable information terminal, an external information processing apparatus, a facsimile machine, etc., via a network or the like, and transmits and receives various types of information including mails and facsimiles to and from such external communication devices.

The timer 16 is a unit that acquires the time through a built-in clock or a network and measures and counts the time.

The operation panel 17 includes a display panel including a liquid crystal panel, or the like, and a touch panel such as a capacitive touch panel that is superimposed on the display panel and detects the position where a finger is touched, and includes a display 171 and an operation acceptor 172.

The display 171 is a unit that displays various types of information and accepts an instruction from a user by a touch panel function.

The display 171 includes, for example, a CRT display, a liquid crystal display, or an EL display, and is a display device such as a monitor or a line display that displays electronic data such as the processing state of an operating system or application software.

The controller 10 includes one or more control circuitries and displays the action and state of the digital multifunction peripheral 1 through the display 171.

The operation acceptor 172 is an interface to operate the digital multifunction peripheral 1 and is a unit that accepts an instruction from the user.

The power supply 18 supplies power to each unit of the digital multifunction peripheral 1.

As the power supply 18, for example, an AT power supply, an ATX power supply, or an SFX power supply is used.

The power supply controller 19 is a unit that includes one or more control circuitries and controls ON/OFF of the power supply 18 based on an instruction from the controller 10. The power supply controller 19 shifts the digital multifunction peripheral 1 to the sleep state based on a predetermined sleep state shift condition.

Further, the power supply controller 19 returns the digital multifunction peripheral 1 from the sleep state to the ready state based on a predetermined return condition such as when there is a detection by the human detecting sensor 21.

The mode setter 20 is a unit that accepts a setting as to whether various jobs are to be executed in the normal mode or the silent mode.

The human detecting sensor 21 is a sensor that detects the presence of a person when an object is present within a predetermined range (e.g., 0 m to 5 m).

Print Process after Return from Sleep State of Digital Multifunction Peripheral 1

Next, with reference to FIGS. 3 and 4, a description will be given of a process when a print execution instruction was accepted after the digital multifunction peripheral 1 returned from the sleep state.

Figure 3:
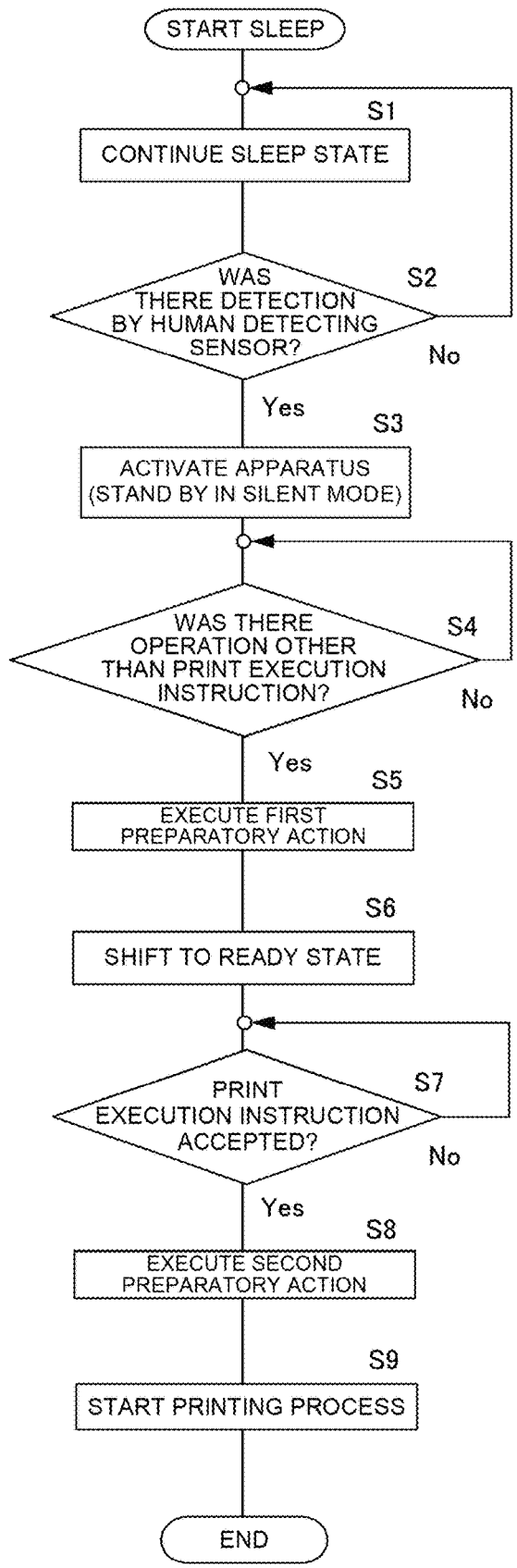
FIG. 3 is a flowchart illustrating an example of a process when a print execution instruction was accepted after the digital multifunction peripheral according to the present disclosure returned from the sleep state.

FIG. 3 is a flowchart illustrating an example of a process when a print execution instruction was accepted after the digital multifunction peripheral 1 according to the present disclosure returned from the sleep state.

In FIG. 3, it is assumed that the digital multifunction peripheral 1 is in the process of shifting to the sleep state.

In Step S1 of FIG. 3, while the sleep state is continued (Step S1), in Step S2, the controller 10 determines whether there was a detection by the human detecting sensor 21 (Step S2).

When there was no detection by the human detecting sensor 21 (No in Step S2), the controller 10 returns the process to Step S1 and continues the sleep state.

Conversely, when there was a detection by the human detecting sensor 21 (Yes in Step S2), in Step S3, the controller 10 activates the apparatus and causes the apparatus to stand by in the silent mode (Step S3).

Next, in Step S4, the controller 10 determines whether there was an operation other than a print execution instruction (Step S4).

Here, "there was an operation other than a print execution instruction" means that there was a predetermined operation other than a print execution instruction, such as when the user touched a touch panel with a finger, when a job confirmation/setting operation was performed, or when a USB memory was inserted into a USB terminal (not illustrated) of the digital multifunction peripheral 1.

When there was an operation other than a print execution instruction (Yes in Step S4), in Step S5, the controller 10 causes the image former 12 to execute a predetermined first preparatory action as a warm-up action (Step S5).

Here, the first preparatory action is an action not involving driving of the motor for the photoreceptor drum, the fuser, and the like, of the image former 12.

Examples of the first preparatory action include the following actions.

Example of First Preparatory Action
- To heat a rotary member (a fusing roller or a fusing belt) of the fuser to a predetermined target temperature while keeping it stationary
- To detect the mounting states of a toner cartridge, the developer, the fuser, the photoreceptor drum, a waste toner box, etc.
- To detect incompatibility of the toner cartridge, the developer, etc.
- Initial preparatory action of an exposure device such as shading, polygon driving, and forced lighting
- Cleaner action of the charger and PTC cleaner action When the first preparatory action is completed, in the subsequent Step S6, the controller 10 shifts the image former 12 to the ready state (Step S6).

Next, in Step S7, the controller 10 determines whether the operation acceptor 172 accepted a print execution instruction (Step S7).

Figure 4:
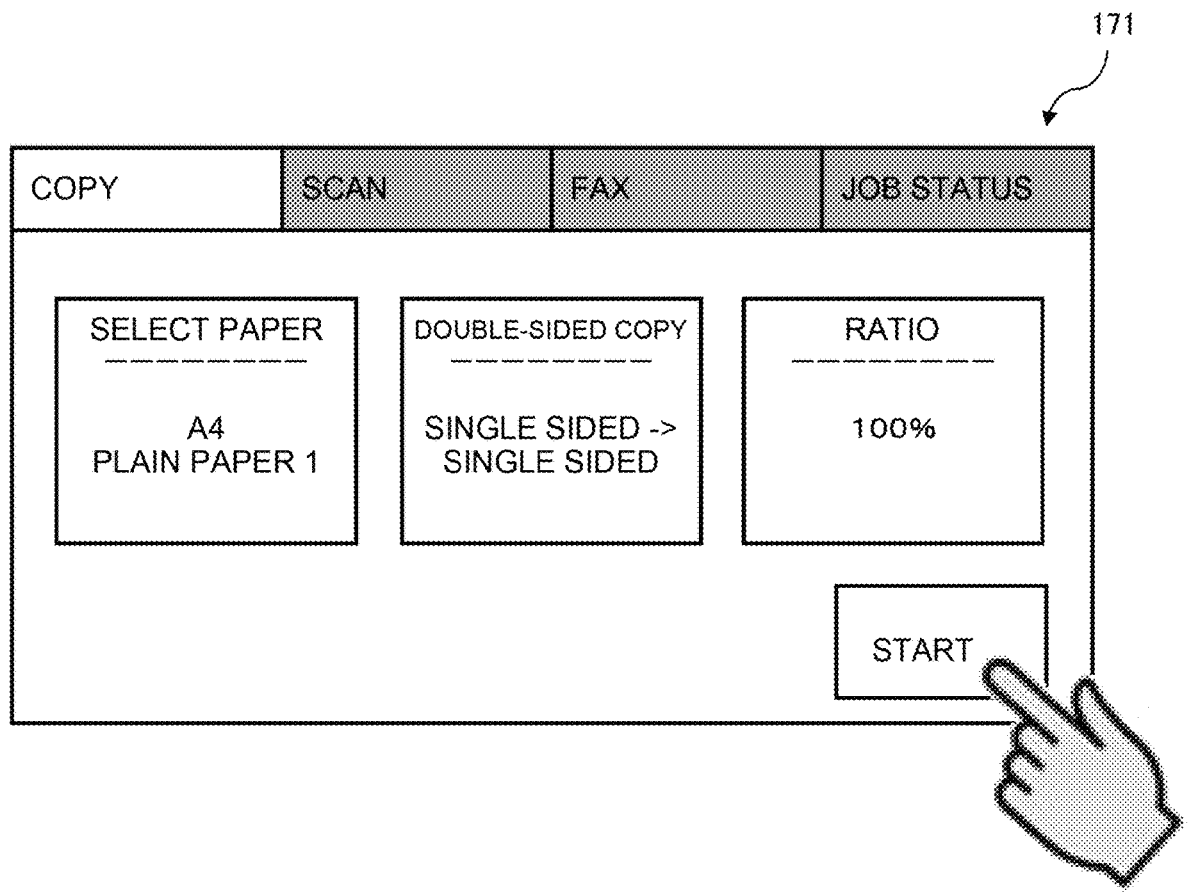
FIG. 4 is an explanatory diagram illustrating an example of a copy screen of the digital multifunction peripheral illustrated in FIG. 1.

FIG. 4 is an explanatory diagram illustrating an example of a copy screen of the digital multifunction peripheral 1 illustrated in FIG. 1.

As illustrated in FIG. 4, when the user presses a "start" button for copying, it is assumed that the operation acceptor 172 accepted a print execution instruction.

When the operation acceptor 172 accepted a print execution instruction (Yes in Step S7), in Step S8, the controller 10 causes the image former 12 to execute a predetermined second preparatory action (Step S8).

Here, the second preparatory action is a warm-up action involving driving of the motor for the photoreceptor drum, the fuser, and the like, of the image former 12.

Furthermore, examples of the second preparatory action include the following actions.

Example of Second Preparatory Action
- To heat the rotary member of the fuser to a predetermined target temperature while driving the rotary member
- To apply pressure to the fuser
- Idling of the photoreceptor drum (driving of the photoreceptor drum for the improvement of chargeability/developability after being left unattended for a long time)
- Lifting/lowering action of a primary transferer and lifting/lowering action of a secondary transferer
- Toner supply action of the toner cartridge
- Toner solid discharge action of the toner cartridge (discharge action of the toner in the developer for the improvement of developability after being left unattended for a long time)
- Cleaning action of the transferer
- Confirmation of separation of a charge roller
- Process control (image quality adjustment) action When the second preparatory action is completed, in the subsequent Step S9, the controller 10 causes the image former 12 to start a printing process (Step S9).

Then, when the printing process is completed, the controller 10 ends the process.

Figure 5:
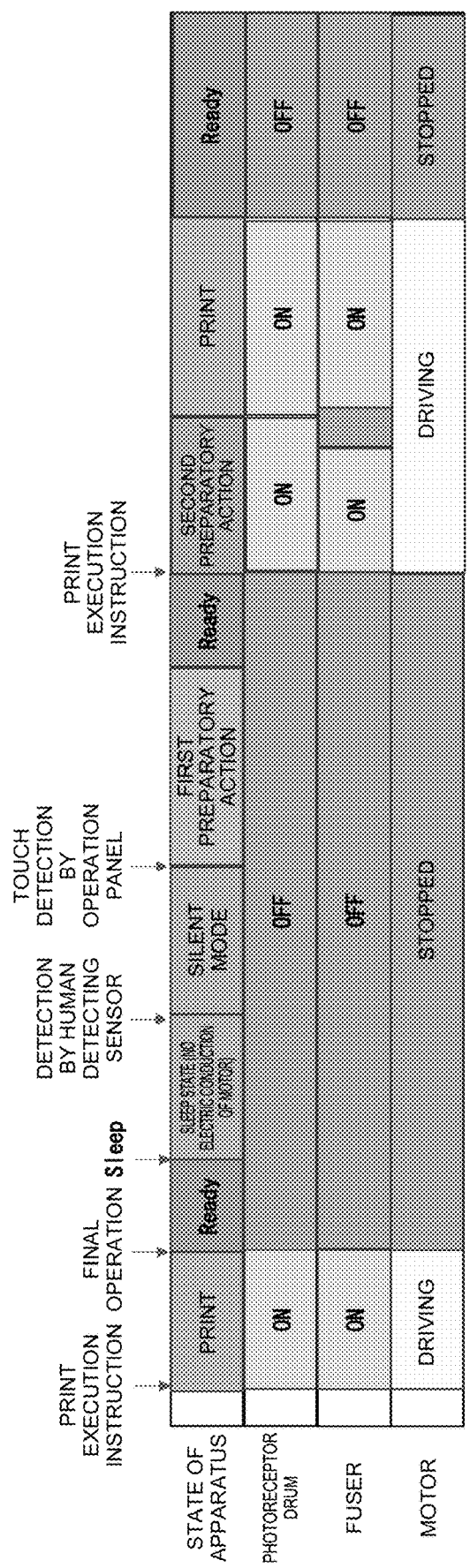
FIG. 5 is an explanatory diagram illustrating the driving timing of a motor for an image former of the digital multifunction peripheral according to the present disclosure.

FIG. 5 is an explanatory diagram illustrating the driving timing of the motor for the image former 12 of the digital multifunction peripheral 1 according to the present disclosure. The motor in this figure is assumed to be a motor that commonly drives the photoreceptor drum and the fuser.

In FIG. 5, in a state where the operation acceptor 172 accepted a print execution instruction and printing is being performed, the motor drives the photoreceptor drum and the fuser.

Then, when the user finishes the final operation, the digital multifunction peripheral 1 enters the ready state.

Afterward, when a predetermined time has elapsed, the digital multifunction peripheral 1 turns off the electric conduction of the motor and shifts to the sleep state.

Subsequently, when the human detecting sensor detects a user, the digital multifunction peripheral 1 activates the apparatus and stands by in the silent mode.

Then, in response to a detection of a touch on the operation panel 17, the digital multifunction peripheral 1 performs the first preparatory action and then shifts to the ready state.

Then, in response to acceptance of a print execution instruction, the digital multifunction peripheral 1 performs the second preparatory action, executes the print process, and then shifts to the ready state again.

Furthermore, the motor, which drives the photoreceptor drum and the fuser, is stopped from the final operation until acceptance of a print execution instruction again.

When a print execution instruction is accepted, the motor drives the photoreceptor drum and the fuser.

Then, after the printing process is finished, the motor, which drives the photoreceptor drum and the fuser, is stopped again.

Modification

Furthermore, instead of a detection by the human detecting sensor 21, the first preparatory action and the second preparatory action may be executed in the same manner as described above when there is a return from the sleep state in a case where the paper in a paper feed tray is replenished, when the toner cartridge is replaced, or when a remote access is made.

In this manner, the warm-up action is performed at appropriate timing at the time of a return from the sleep state, and thus it is possible to achieve the digital multifunction peripheral 1 that consumes less power and generates less noise due to the execution of the warm-up action and has higher user-friendliness than before.

Second Embodiment

Print Process after Return from Sleep State of Digital Multifunction Peripheral 1 According to Second Embodiment of Present Disclosure Next, with reference to FIG. 6, a description will be given of a process when a print execution instruction was accepted after the digital multifunction peripheral 1 according to a second embodiment of the present disclosure returned from the sleep state.

A configuration of the digital multifunction peripheral 1 according to the second embodiment is the same as the configuration (FIG. 2) of the digital multifunction peripheral 1 according to the first embodiment, and therefore a description thereof will be omitted.

FIG. 6 is a flowchart illustrating an example of a process in which the digital multifunction peripheral 1 according to the second embodiment of the present disclosure returns from the sleep state and starts the print process.

The processes in Steps S11 to S17, S19, and S20 in FIG. 6 correspond to the processes in Steps S1 to S9 in FIG. 3 (the first embodiment), respectively, and thus the description thereof will be omitted.

The process in Step S18 in FIG. 6, which is different from that in the first embodiment, will be described here.

In Step S17 of FIG. 6, when the operation acceptor 172 accepted a print execution instruction (Yes in Step S17), in Step S18, the controller 10 determines whether driving of the motor is unnecessary (Step S18).

Here, the case where "driving of the motor is unnecessary" includes, for example, a case where a print execution instruction is accepted immediately after the previous print process is completed and the temperature of the fuser is not much lower than the target temperature, or a case where an image quality adjustment action involving driving of the photoreceptor drum is unnecessary.

When driving of the motor is unnecessary (Yes in Step S18), in Step S20, the controller 10 causes the image former 12 to start a print process (Step S20).

Conversely, when driving of the motor is necessary (No in Step S18), in Step S19, the controller 10 causes the image former 12 to execute the predetermined second preparatory action (Step S19).

Here, the case where "driving of the motor is necessary" includes, for example, a case where it takes a long time to accept a print execution instruction after the previous print process is completed, the temperature of the fuser is lower than the target temperature, and therefore the fuser needs to be reheated and driven, and a case where the photoreceptor drum needs to be driven for image quality adjustment.

In this way, in a case where the print execution instruction was accepted immediately after the previous image formation, the image formation is started without executing the second preparatory action, and thus it is possible to achieve the digital multifunction peripheral 1 that consumes less power and generates less noise due to the execution of the warm-up action and has higher user-friendliness than before.

Third Embodiment

Print Process after Return from Sleep State of Digital Multifunction Peripheral 1 According to Third Embodiment of Present Disclosure Next, with reference to FIG. 7, a description will be given of a process when a print execution instruction was accepted after the digital multifunction peripheral 1 according to a third embodiment of the present disclosure returned from the sleep state.

A configuration of the digital multifunction peripheral 1 according to the third embodiment is the same as the configuration (FIG. 2) of the digital multifunction peripheral 1 according to the first embodiment, and therefore a description thereof will be omitted.

According to the third embodiment, it is assumed that the fuser and the photoreceptor drum are individually driven by different motors in the image former 12.

FIG. 7 is a flowchart illustrating an example of a process in which the digital multifunction peripheral 1 according to the third embodiment of the present disclosure returns from the sleep state and starts the print process.

The processes in Steps S21 to S25, S27, and S28 in FIG. 7 correspond to the processes in Steps S1 to S5, S8, and S9 in FIG. 3 (the first embodiment), respectively, and thus the description thereof will be omitted.

The process in Step S26 of FIG. 7, which is different from that in the first embodiment, will be described here.

In Step S25 of FIG. 7, after causing the image former 12 to execute the predetermined first preparatory action (Step S25), in Step S26, the controller 10 determines whether the operation acceptor 172 accepted a print execution instruction before the first preparatory action is completed (Step S26).

In a case where the operation acceptor 172 accepted a print execution instruction before the first preparatory action is completed (Yes in Step S26), in Step S27, when there is a process shiftable to the second preparatory action even during the first preparatory action, the controller 10 causes the image former 12 to start execution of the second preparatory action as soon as shifting becomes possible (Step S27).

Here, when the fuser and the photoreceptor drum are individually driven by different motors, the timing of completion of the first preparatory actions of the fuser and the photoreceptor drum may differ depending on the situation.

For example, when the fuser is sufficiently warm, there is a high possibility that the first preparatory action of the fuser is completed earlier than the first preparatory action of the photoreceptor drum.

In this case, the execution of the second preparatory action of the fuser may start without waiting for the completion of the first preparatory action of the photoreceptor drum.

On the other hand, when the fuser is cooler than usual, there is a high possibility that the first preparatory action of the fuser is completed later than the first preparatory action of the photoreceptor drum.

In this case, the execution of the second preparatory action of the photoreceptor drum may start without waiting for the completion of the first preparatory action of the fuser.

Further, the following two cases (A) and (B) are possible even for the process of the same component.
- (A) The process continuously performed in the second preparatory action after the process of the first preparatory action is completed
- (B) The process shiftable to the second preparatory action even during the execution of the process of the first preparatory action Examples of (A) include a case where, after the mounting detection of the toner cartridge is completed as the first preparatory action, the supply operation of the toner cartridge is continuously performed as the second preparatory action.

Examples of (B) include a case where, when a print execution instruction was accepted during the execution of the stationary heating process of the fuser as the first preparatory action, the process is shifted so that, while the heating process is continued as the second preparatory action, the fuser is driven by the motor and rotated such that the heat of the heater is uniformly applied to the belt and the roller.

On the other hand, when the operation acceptor 172 accepted a print execution instruction after the first preparatory action was completed (No in Step S26), in Step S28, the controller 10 causes the image former 12 to execute the predetermined second preparatory action (Step S28).

In this way, in a case where the operation of the print execution instruction was accepted before the first preparatory action is completed, when there is a process shiftable to the second preparatory action even during the execution of the first preparatory action, the execution of the second preparatory action is started as soon as shifting becomes possible, and thus it is possible to achieve the digital multifunction peripheral 1 having higher user-friendliness than before with regard to the execution of the warm-up action.

A preferred aspect of the present disclosure includes a combination of any of the aspects described above.

In addition to the above-described embodiments, there may be various modifications of the present disclosure. It should not be understood that such modifications fall outside the scope of the present disclosure. The present disclosure should include meanings equivalent to the scope of the claims and all modifications within the scope.

While there have been described what are at present considered to be certain embodiments of the invention, it will be understood that various modifications may be made thereto, and it is intended that the appended claims cover all such modifications as fall within the true spirit and scope of the invention.

What is claimed is:

1. An image-forming apparatus comprising:
   a human detecting sensor;
   an operation acceptor that accepts an operation from a user;
   an image former that drives a motor and forms an image based on a print execution instruction accepted by the operation acceptor;
   one or more controllers that control the human detecting sensor, the operation acceptor, and the image former; and
   one or more power supply controllers, that control power supply that is supplied to the image former and the one or more controllers, the one or more power supply controllers shifting the image-forming apparatus to a predetermined sleep state when the operation acceptor accepts no operation during a predetermined standby time, and returning the image-forming apparatus from the predetermined sleep state to a predetermined standby state when a detection by the human detecting sensor occurs after shifting to the predetermined sleep state, wherein
   the one or more controllers:
      determine whether the operation acceptor has accepted an operation other than the print execution instruction after the predetermined sleep state has returned to the predetermined standby state,
      cause the image former to execute a predetermined first preparatory action not involving driving the motor when the operation acceptor has accepted the operation other than the print execution instruction,
      when the operation acceptor accepts the print execution instruction, cause the image former to execute a predetermined second preparatory action involving driving the motor and start image formation, and
      cause the image former to start the image formation without causing the image former to execute the predetermined second preparatory action when:
         the operation acceptor accepts the print execution instruction after the one or more controllers cause the image former to execute the predetermined first preparatory action, and
         the one or more controllers determine that the predetermined second preparatory action is unnecessary.

2. The image-forming apparatus according to claim 1, wherein a rotation direction of the motor in the predetermined second preparatory action is identical to, or opposite to, a rotation direction of the motor during the image formation.

3. The image-forming apparatus according to claim 1, wherein a rotation speed of the motor in the predetermined second preparatory action is identical to, or different from, a rotation speed of the motor during the image formation.

4. The image-forming apparatus according to claim 1, wherein the image former includes:
   a photoreceptor,
   a charger that charges the photoreceptor in contact with the photoreceptor,
   an exposure executor that forms an electrostatic latent image on the photoreceptor,
   a developer that supplies toner to the photoreceptor and forms a toner image corresponding to the electrostatic latent image,
   a transferer that transfers the toner image to a recording medium, and
   a fuser that thermally fuses the toner image to the recording medium, wherein
   the photoreceptor, the transferer, and the fuser are driven by one or more of the motors, including the motor.

5. The image-forming apparatus according to claim 4, wherein
   the fuser includes a rotary member driven by the one or more motors and a heater that heats the rotary member,
   the predetermined first preparatory action includes a process to heat the rotary member to a predetermined target temperature while keeping the rotary member stationary, and
   the predetermined second preparatory action includes a process to cause the one or more motors to drive the rotary member while keeping the rotary member heated to the predetermined target temperature.

6. An image-forming apparatus comprising:
   a human detecting sensor;
   an operation acceptor that accepts an operation from a user;
   an image former that drives a motor and forms an image based on a print execution instruction accepted by the operation acceptor;
   one or more controllers that control the human detecting sensor, the operation acceptor, and the image former; and
   one or more power supply controllers, that control power supply that is supplied to the image former and the one or more controllers, the one or more power supply controllers shifting the image-forming apparatus to a predetermined sleep state when the operation acceptor accepts no operation during a predetermined standby time, and returning the image-forming apparatus from the predetermined sleep state to a predetermined standby state when a detection by the human detecting sensor occurs after shifting to the predetermined sleep state, wherein the one or more controllers:
    determine whether the operation acceptor has accepted an operation other than the print execution instruction after the predetermined sleep state has returned to the predetermined standby state,
    cause the image former to execute a predetermined first preparatory action not involving driving the motor when the operation acceptor has accepted the operation other than the print execution instruction,
    when the operation acceptor accepts the print execution instruction, cause the image former to execute a predetermined second preparatory action involving driving the motor and start image formation, and
    cause the image former to start executing the predetermined second preparatory action as soon as the shifting becomes possible when:
    the operation acceptor accepts the print execution instruction before the predetermined first preparatory action is completed, and
    a process shiftable to the predetermined second preparatory action exists even during the execution of the predetermined first preparatory action.

7. An image-forming apparatus comprising:
a human detecting sensor;
an operation acceptor that accepts an operation from a user;
an image former that drives a motor and forms an image based on a print execution instruction accepted by the operation acceptor;
one or more controllers that control the human detecting sensor, the operation acceptor, and the image former; and
one or more power supply controllers, that control power supply that is supplied to the image former and the one or more controllers, the one or more power supply controllers shifting the image-forming apparatus to a predetermined sleep state when the operation acceptor accepts no operation during a predetermined standby time, and returning the image-forming apparatus from the predetermined sleep state to a predetermined standby state when a detection by the human detecting sensor occurs after shifting to the predetermined sleep state, wherein the one or more controllers:

determine whether the operation acceptor has accepted an operation other than the print execution instruction after the predetermined sleep state has returned to the predetermined standby state, cause the image former to execute a predetermined first preparatory action not involving driving the motor when the operation acceptor has accepted the operation other than the print execution instruction, and when the operation acceptor accepts the print execution instruction, cause the image former to execute a predetermined second preparatory action involving driving the motor and start image formation, and the predetermined first preparatory action includes a process to detect a mounting state of each component of the image former and a process to detect an error state.

* * * * *